United States Patent [19]

Inoguchi et al.

[11] Patent Number: 4,476,236

[45] Date of Patent: Oct. 9, 1984

[54] METHOD FOR PRODUCING A CORDIERITE BODY

[75] Inventors: Kazuhiro Inoguchi; Mitsuru Asano; Kunio Okamoto, all of Okazaki; Tomohiko Nakanishi, Kariya, all of Japan

[73] Assignee: Nippon Soken, Inc., Nishio, Japan

[21] Appl. No.: 511,723

[22] Filed: Jul. 8, 1983

Related U.S. Application Data

[63] Continuation of Ser. No. 275,509, Jun. 19, 1981, abandoned.

[30] Foreign Application Priority Data

Oct. 24, 1980 [JP] Japan .................................. 55-149535

[51] Int. Cl.$^3$ ........................ C04B 35/04; C04B 35/18
[52] U.S. Cl. ................................. 501/118; 264/177 R; 501/119; 501/120; 501/153; 501/154; 501/141; 502/439
[58] Field of Search ................ 501/118, 119, 120, 141, 501/153, 154; 264/177 R; 423/327; 502/439

[56] References Cited

U.S. PATENT DOCUMENTS

| | | | |
|---|---|---|---|
| 3,885,977 | 5/1975 | Lachman et al. | 501/119 X |
| 4,001,028 | 1/1977 | Frost et al. | 501/118 |
| 4,235,855 | 11/1980 | Cleveland | 501/119 |
| 4,280,845 | 7/1981 | Matsuhisa et al. | 501/119 |
| 4,295,892 | 10/1981 | Matsuhisa et al. | 501/119 X |
| 4,373,895 | 2/1983 | Yamamoto et al. | 264/177 R |
| 4,385,129 | 5/1983 | Inoguchi et al. | 501/118 |

Primary Examiner—Helen M. McCarthy
Attorney, Agent, or Firm—Cushman, Darby & Cushman

[57] ABSTRACT

A method for producing a cordierite body having no anisotropic property in coefficient of thermal expansion comprises the steps of preparing a raw material containing kaolin mineral and talc as main ingredients, and preformed cordierite particles formed from the raw material, mixing and kneading the raw material together with the preformed cordierite particles into a slurry, forming the slurry into a formed body and firing the formed body.

4 Claims, 2 Drawing Figures

METHOD FOR PRODUCING A CORDIERITE BODY

CROSS REFERENCE TO RELATED APPLICATIONS

This application is a continuation of our earlier application Ser. No. 275,509 filed June 19, 1981, now abandoned.

BACKGROUND OF THE INVENTION

The present invention relates to a method for producing a cordierite body.

Cordierite ($2MgO.2Al_2O_3.5SiO_2$) has excellent low thermal expansion properties. Therefore, cordierite is used as one material for parts requiring thermal shock resistance in order to endure the repeated cycles of rapid increases and decreases in temperature, such as a catalyst support for purifying exhaust gases.

The coefficient of thermal expansion of cordierite has been generally known as $26.0 \times 10^{-7}/°C$. in the range of $25° \sim 1000°$ C. Recently, ceramic having an improved thermal shock resistance has been required. Upon making various studies, a cordierite body having an excellent low expansion property as low as $17.0 \times 10^{-7}/°C$. ($25° \sim 1000°$ C.) can be obtained by eliminating alkali metals, such as sodium and potassium, alkaline-earth metals, such as calcium and other impurities having a bad effect on the low thermal expansion property of cordierite, from the material.

Furthermore, it has been reported that by orienting the anisotropic property of the cordierite crystals, cordierite bodies having coefficients of thermal expansion of less than $11.0 \times 10^{-7}/°C$. in the range of $25° \sim 1000°$ C. in at least one direction can be obtained.

For example, one of the methods for orienting the cordierite crystals to reduce the thermal expansion of the cordierite body in at least one direction is shown in U.S. Pat. No. 3,885,977.

In U.S. Pat. No. 3,885,977, there is stated that a cordierite body having thermal expansion as low as $11.0 \times 10^{-7}/°C$. in a specific direction is obtained by forming a batch raw material containing plate-shaped clay particles or stacked clay which can be delaminated into plate-shaped particles during processing by such means as to impart a planar orientation to the plate-shaped clay particles, for example extrusion forming, drying and firing the obtained formed body.

As described above, by anisostatically forming a batch raw material mainly composed of plate-shaped particles of kaolin mineral and talc, a planar orientation is imparted to the plate-shaped particles, and the obtained cordierite body exhibits a low expansion property in the direction along the extrusion direction.

However, coefficients of thermal expansion of the obtained cordierite body in the direction perpendicular to the extrusion direction and that of the thickness thereof remain larger than that in the extrusion direction thereof. The difference of the coefficients of thermal expansion becomes larger as the coefficient of thermal expansion in the extrusion direction becomes smaller.

When coefficients of thermal expansion in the above described directions are largely different from each other, the cordierite body is liable to be damaged due to thermal distortion when being subjected to a rapid increase in temperature.

Therefore, when a honeycomb structured catalyst support for purifying exhaust gas is made of such a cordierite body as described above, the catalyst support is in danger of being broken due to the thermal distortion caused by repeated cycles of rapid increase and decrease in temperature, even if the wall thickness thereof is made thin.

Accordingly, one object of the present invention is to provide a method for producing a cordierite body having a low thermal expansion coefficient in any direction thereof.

Another object of the present invention is to provide a method for producing a cordierite body having excellent mechanical strength.

Still another object of the present invention is to provide a method for producing a cordierite body having excellent thermal shock resistance which is suited to be used as a catalyst support for purifying exhaust gas of a vehicle.

DESCRIPTION OF THE DRAWINGS

Other objects and advantages of the invention will become apparent from the following description of embodiments with reference to the accompanying drawings wherein.

SUMMARY OF THE INVENTION

Figure 1:
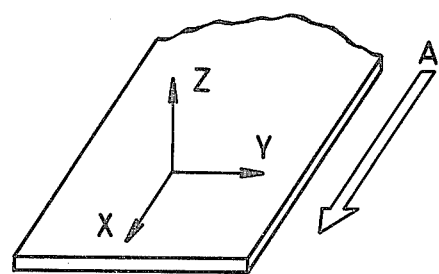
FIG. 1 is a representation showing a cordierite body which is obtained by extrusion forming.

We inventors have made various studies and experiments to obtain a cordierite body exhibiting similar and lower coefficients of thermal expansion in all directions.

As a result, we have found that by preparing a batch material composed of a mixture of a raw material mainly containing kaolin minerals and talc, and preformed cordierite particles, forming and firing the prepared batch material, the cordierite body exhibiting a similar low coefficient of thermal expansion in any direction can be obtained even when being subjected to an anisostatic forming method such as an extrusion forming.

The raw material which is used in the method of the present invention contains kaolin minerals and talc as the main ingredients. In addition, aluminum hydroxide, alumina, silica and the like may be included in the raw material.

As talc, raw talc and prefired talc can be used together. By using the prefired talc which is thermally stable, firing shrinkage of the cordierite body can be decreased in the firing step.

The preformed cordierite particles which are to be included in the batch material of the present invention are formed from the material having the same composition as that of the above described raw material.

The preformed cordierite particles are formed by kneading the above described raw material, firing the kneaded material on the same condition as that of the above described firing step of the cordierite body, at a temperature from 1300° C. to 1420° C. and for about five hours, and pulverizing the obtained synthetic cordierite body.

By adding only a small amount of the preformed cordierite particles into the raw material, the coefficient of thermal expansion in any direction of the obtained cordierite body can be made nearly equal.

According to the inventors' experiment, the cordierite body which was obtained by extruding the batch raw material containing 1.0 to 75.0 weight % of the preformed cordierite by means of a die having narrow slits, and firing the extruded material, exhibited a low coefficient of thermal expansion not more than $16.0 \times 10^{-7}/°C$. in the range of 25° to 1000° C. in any of the extrusion direction, the direction perpendicular to the extrusion direction and the direction of thickness.

Furthermore, by properly selecting the amount of the preformed cordierite particles in the batch material, the obtained cordierite body exhibited the same coefficient of thermal expansion not more than $14.0 \times 10^{-7}/°C$. in any direction thereof.

The preferable average diameter of the preformed cordierite particles ranges from $50.0\mu$ to $1.0\mu$ as well as that of the other particles composing the batch material.

As described above, the cordierite body which is obtained by the method of the present invention has a low and equal coefficient of thermal expansion in any direction and also has very excellent mechanical strength.

Experiment 1

Materials having the chemical composition (weight%) as shown in Table 1, respectively, were mixed with preformed cordierite particles in various mixing ratios as shown in Table 2 to form many kinds of batch materials.

Each batch material was kneaded together with binder and water and was extruded by means of an extrusion die provided with a slit having a rectangular cross section 50 mm long by 3 mm wide in the direction of the arrow A of FIG. 1.

The extruded sheet was fired at 1400° C. for five hours to obtain a cordierite body.

The prefired talc which was used as one of the materials, was prepared by pulverizing the layered raw talc to be delaminated along (001) plane into plate-shaped particles and firing the obtained plate-shaped particles.

The preformed cordierite particles were prepared by firing the material A shown in Table 2 at a temperature up to 1400° C. for five hours, pulverizing the obtained synthetic cordierite body into the average particle diameter of $13.36\mu$. In Table 1, Ig loss designates an ignition loss.

Next, the coefficient of thermal expansion of each of the obtained cordierite bodies in each of the extrusion direction (X direction in FIG. 1), the direction perpendicular to the extrusion direction (Y direction in FIG. 1) and the direction of wall thickness (Z direction in FIG. 1) was measured.

In the measurement of X and Y directions, samples 50.0 mm long in X and Y direction respectively were used. In the measurement of Z direction, the sample which was prepared by piling a plurality of extruded sheets of the cordierite body like layers, pressing the layered cordierite sheets into the thickness of 50.0 mm and firing the pressed cordierite sheets at 1400° C. for five hours was used.

The result of the measurement of the coefficient of thermal expansion ($\times 10^{-7}/°C$.) of each sample in the range of 25°~1000° C. is shown in Table 3. In Experiments A to U shown in Table 3, the batch material A to U shown in Table 2 were used respectively.

As is apparent from Table 3, by adding the preformed cordierite particles into the batch material, the obtained cordierite body loses the anisotropic property of the coefficient of thermal expansion so that the coefficient of thermal expansion becomes equal in any direction of the cordierite body. This is presumed to be caused by the fact when the extruded sheet material is fired, the planar orientation of the plate-shaped kaolinite and talc particles, which is imparted in the extruding step, is broken by the preformed cordierite particles.

And as the amount of the preformed cordierite particles is increased so as to approach 100% of the batch material (namely the batch material contains preformed cordierite particles alone), the coefficient of thermal expansion of the obtained cordierite body was increased in all directions. This result is presumed to be caused by the fact that the reactivity of the preformed cordierite particles themselves is lower than that of the particles consisting of the raw material only.

The suitable amount of the preformed cordierite particles contained within the batch material ranges from 1.0% (Experiment D) to 75.0% (Experiment R) as shown in Table 3. In this range, the coefficient of thermal expansion of the obtained cordierite body does not exceed $16.0 \times 10^{-7}/°C$. in each direction.

Particularly, in the range from 2.0% (Experiment F) to 35.0% (Experiment M), the coefficients of thermal expansion in three directions are very similar to one another and are not more than $15.0 \times 10^{-7}/°C$.

Experiment 2

Figure 2:
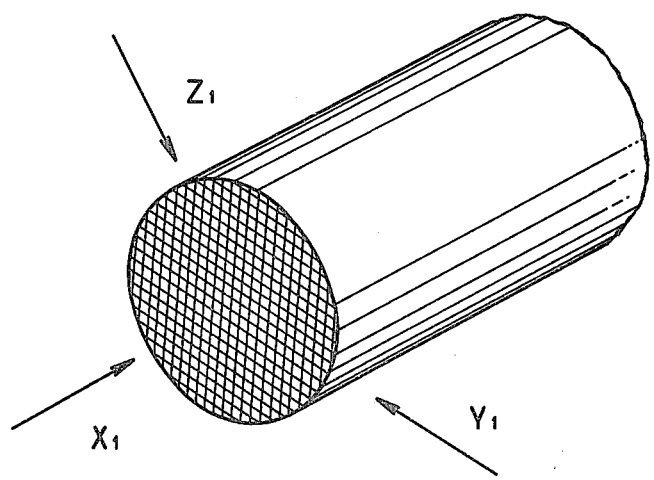
FIG. 2 is a perspective view of a honeycomb structured cordierite body.

The batch materials E, J And R which were used in the method of the present invention and the batch materials A, B and U as comparion samples, which were shown in Table 2, were extruded by means of an extrusion die provided with narrow slits of 0.30 mm width and 300 cell per square inch respectively. Each extruded body was dried and fired at a temperature up to 1400° C. for five hours. As a result, such cordierite honeycomb structures 116.5 mm in diameter and 76.2 mm in height respectively as shown in FIG. 2 were obtained.

And the thermal shock resistance of six samples of the honeycomb structures was measured by the following method.

An electric furnace of which temperature is maintained at a predetermined value. Each sample of the above described honeycomb structure at room temperature was quickly inserted and kept for fifty minutes.

Then, each honeycomb structure was quickly taken out of the electric furnace and allowed to cool to room temperature.

This heating and cooling cycle was repeated up to five times and thermal shock resistance of each sample of the honeycomb structures was estimated from the temperature within the electric furnace and the number of repeated cycles when each sample was cracked. The experimental result is shown in Table 4. As is apparent from this result, thermal shock resistance of each of the cordierite bodies of Experiment E, J and R is superior to that of the cordierite bodies of Experiments A and B (The amount of the preformed cordierite powder within the batch material is so small that the difference between coefficients of thermal expansion in three directions is large.) and the cordierite body of Experiment U (since the batch material contains the preformed cordierite powder alone, coefficient of thermal expansion in three directions are substantially the same, but large.)

Next, three samples of the honeycomb structures which were obtained from each of the materials E, J and R of Table 2 and three samples of the honeycomb structures which were obtained from each of the materials A, B and U of Table 2, were prepared. These samples were put in an electric furnace maintained at 800° C., for five hours, taken out of the electric furnace and allowed to cool to room temperature. This heating and cooling cycle was repeated and the number of the repeated cycles when each honeycomb structure was craked, was observed.

The experimental result is shown in Table 5. As is clearly shown in Table 5, the cordierite bodies of the material E, J and R exhibit more excellent thermal shock resistance than those of the material A, B and U.

Experiment 3

Compressive strength (kg/cm$^2$) of the honeycomb structures which were obtained from the material E, J and R and the material A, B and U respectively in three directions ($X_1$, $Y_1$ and $Z_1$ directions in FIG. 2) was measured. $X_1$ direction designates the axial direction of each honeycomb structure, $Y_1$ direction designates the direction perpendicular to the wall thickness of each cell and $Z_1$ direction designates the direction along the diagonal line of each rectangular cell.

The experimental result is shown in Table 6.

As is apparent from Table 6, mechanical strength of the cordierite bodies (E, J and R) which are made of the material containing preformed cordierite powder is superior to that of the cordierite bodies (A and B) of which material does not contain preformed cordierite powder and that of the cordierite body (U) which is made of preformed cordierite powder only.

TABLE 1

| Chemical Composition | Raw Talc | Prefired Talc | Aluminum Hydroxide | Alumina | Kaolinite |
|---|---|---|---|---|---|
| $SiO_2$ | 63.00 | 66.05 | 0.02 | 0.02 | 49.30 |
| $Al_2O_3$ | 0.10 | 0.10 | 65.13 | 99.50 | 36.00 |
| MgO | 31.70 | 33.23 | — | — | 0.08 |
| $Fe_2O_3$ | 0.03 | 0.03 | 0.01 | 0.01 | 0.28 |
| $TiO_2$ | — | — | — | — | 1.76 |
| CaO | 0.03 | 0.03 | — | — | 0.04 |
| $K_2O$ | — | — | 0.43 | 0.43 | 0.01 |
| $Na_2O$ | — | — | — | — | 0.03 |
| Ig loss | 4.58 | — | 34.45 | — | 13.25 |
| Average Particle Diameter ($\mu$) | 16.2 | 15.0 | 1.2 | 1.0 | 2.6 |

TABLE 2

| Material | A | B | C | D | E | F | G | H | I | J | K |
|---|---|---|---|---|---|---|---|---|---|---|---|
| Raw Talc | 36.54 | 18.43 | 18.33 | 18.25 | 18.16 | 18.06 | 17.51 | 16.59 | 15.66 | 14.74 | 13.83 |
| Prefired Talc | — | 18.43 | 18.34 | 18.24 | 18.15 | 18.06 | 17.51 | 16.59 | 15.67 | 14.74 | 13.82 |
| Kaolinite | 41.12 | 42.47 | 42.26 | 42.05 | 41.83 | 41.62 | 40.35 | 38.22 | 36.10 | 33.98 | 31.85 |
| Aluminun Hydroxide | 22.34 | 16.11 | 16.03 | 15.95 | 15.87 | 15.79 | 15.30 | 14.50 | 13.69 | 12.89 | 12.08 |
| Alumina | — | 4.56 | 4.54 | 4.51 | 4.49 | 4.47 | 4.33 | 4.10 | 3.88 | 3.65 | 3.42 |
| Preformed Cordierite | — | — | 0.5 | 1.0 | 1.5 | 2.0 | 5.0 | 10.0 | 15.0 | 20.0 | 25.0 |

| Material | L | M | N | O | P | Q | R | S | T | U |
|---|---|---|---|---|---|---|---|---|---|---|
| Raw Talc | 12.90 | 11.98 | 11.06 | 9.21 | 7.37 | 5.53 | 4.60 | 3.69 | 1.84 | — |
| Prefired Talc | 12.90 | 11.98 | 11.06 | 9.22 | 7.37 | 5.53 | 4.61 | 3.69 | 1.84 | — |
| Kaolinite | 29.73 | 27.61 | 25.48 | 21.23 | 16.99 | 12.74 | 10.62 | 8.49 | 4.25 | — |
| Aluminum Hydroxide | 11.28 | 10.47 | 9.67 | 8.06 | 6.45 | 4.83 | 4.03 | 3.22 | 1.61 | — |
| Alumina | 3.19 | 2.96 | 2.73 | 2.28 | 1.82 | 1.37 | 1.14 | 0.91 | 0.46 | — |
| Preformed Cordierite | 30.0 | 35.0 | 40.0 | 50.0 | 60.0 | 70.0 | 75.0 | 80.0 | 90.0 | 100.0 |

TABLE 3

| Direction of Measurement | | A | B | C | D | E | F | G | H | I | J |
|---|---|---|---|---|---|---|---|---|---|---|---|
| Coeffecient of Thermal Expansion | X direction | 6.5 | 7.2 | 10.8 | 11.7 | 12.8 | 13.6 | 14.3 | 13.8 | 13.3 | 13.5 |
|  | Y direction | 10.8 | 11.3 | 12.9 | 13.3 | 13.6 | 14.0 | 13.9 | 13.9 | 13.4 | 13.6 |
|  | Z direction | 23.1 | 22.5 | 18.5 | 15.0 | 14.8 | 14.7 | 14.6 | 14.2 | 13.8 | 13.5 |

| Direction of Measurement | | K | L | H | N | O | P | Q | R | S | T | U |
|---|---|---|---|---|---|---|---|---|---|---|---|---|
| Coeffecient of Thermal Expansion | X direction | 13.3 | 13.6 | 13.5 | 13.9 | 14.0 | 14.2 | 14.5 | 15.2 | 16.1 | 16.8 | 17.3 |
|  | Y direction | 13.7 | 13.7 | 13.6 | 14.2 | 14.1 | 14.4 | 14.8 | 15.2 | 15.9 | 17.2 | 17.5 |
|  | Z direction | 13.6 | 13.7 | 13.8 | 14.6 | 14.5 | 14.1 | 14.7 | 15.4 | 16.3 | 17.7 | 17.4 |

TABLE 4

| Experiment | | Temperature | Times |
|---|---|---|---|
| Samples of the Present Invention | E | 850 | 5 (not cracked) |
|  |  | 900 | 4 |
|  | J | 900 | 5 (not cracked) |
|  |  | 950 | 2 |
|  | R | 850 | 5 (not cracked) |
|  |  | 900 | 3 |
| Comparison Samples | A | 800 | 5 (not cracked) |
|  |  | 850 | 2 |
|  | B | 800 | 5 (not cracked) |
|  |  | 850 | 4 |
|  | U | 800 | 5 (not cracked) |
|  |  | 850 | 1 |

TABLE 5

| Sample No. | Times | | | | | |
|---|---|---|---|---|---|---|
| | Samples of the Present Invention | | | Comparison Samples | | |
| | E | J | R | A | B | U |
| 1 | 42 | 48 | 32 | 11 | 15 | 6 |
| 2 | 46 | 52 | 23 | 12 | 9 | 10 |
| 3 | 41 | 49 | 35 | 8 | 10 | 7 |
| Average Times | 43 | 49.7 | 30 | 10.3 | 11.3 | 7.7 |

TABLE 6

| Direction | Compressive Strength | | | | | |
|---|---|---|---|---|---|---|
| | Samples of the Present Invention | | | Comparison Samples | | |
| | E | J | R | A | B | U |
| $X_1$ direction | 44.0 | 48.7 | 39.8 | 32.2 | 33.7 | 29.6 |
| $Y_1$ direction | 92.2 | 96.6 | 83.5 | 70.5 | 72.3 | 66.4 |
| $Z_1$ direction | 9.02 | 9.23 | 8.75 | 6.67 | 6.85 | 5.96 |

As described above, the present invention is characterized in that a cordierite body is produced by adding preformed cordierite particles into the raw material containing kaolin mineral and talc as main ingredients, forming and firing the prepared batch material.

The cordierite body which is obtained according to the method of the present invention has no anisotropic property in coefficient of thermal expansion even when the cordierite body is formed by the anisostatic forming means.

The cordierite body of the present invention exhibits an almost equal and low coefficient of thermal expansion in any direction.

Accordingly, the cordierite body produced by the method of the present invention exhibits very excellent thermal shock resistance even when the cordierite body is subjected to the cycles of rapid increase and decrease in temperature. And the cordierite body of the present invention also has excellent mechanical strength.

Therefore, the method of the present invention can be effectively applied to the method for producing a cordierite body which is subjected to repeated heating and cooling cycles and vibrations, such as a catalyst support for purifying exhaust gas, which is provided in the exhaust system of a vehicle.

Having now fully described the invention, it will be apparent to one of ordinary skill in the art that many changes and modifications can be made thereto without departing from the spirit or scope of the invention as set forth herein.

What is claimed is:

1. A method for producing a cordierite body comprising the sequential steps of:
   (1) preparing a first batch material having an average particle diameter of from about 1 to about 50 microns consisting essentially in weight percent of 33.98 to 42.05% kaolin mineral particles, 14.74 to 18.24% raw talc particles, 14.74 to 18.25% fired talc particles
   produced by delaminating pulverized, layered raw talc along (001) Plane into plate-shaped particles then firing said plate-shaped particles, and at least one of aluminum hydroxide or alumina, the batch material having substantially the same composition ratio as the theoretical composition ratio for cordierite;
   (2) adding to the batch material prepared in step (1) from about 1 to about 20 weight percent of preformed cordierite particles having substantially the same composition as that of the batch material and having an average particle diameter of from about 1 to about 50 microns,
   said preformed cordierite particles being prepared by mixing together and kneading a second batch material, consisting essentially of kaolin mineral particles, raw talc particles and at least one of aluminum hydroxide or alumina, into a slurry, forming said slurry into a formed body, drying and firing the formed body to form synthetic cordierite, then pulverizing the synthetic cordierite into cordierite particles;
   (3) mixing and kneading the batch material and preformed cordierite particles together to form a slurry;
   (4) anisostatically forming said batch into a formed body of the desired shape; and
   (5) drying and firing said formed body,
   the resulting cordierite body having a coefficient of thermal expansion which is nearly equal and is $\leq 15.0 \times 10^{-7}/°C$. in the range of 25° to 1,000° C. in all directions.

2. The method according to claim 1, in which said performed cordierite particles are prepared by firing said formed body at a temperature from about 1,300° C. to about 1,420° C.

3. The method according to claim 1, in which the amount of said preformed cordierite particles added in step (2) is about 1.0 to about 10 weight %.

4. A catalyst support made of the cordierite body produced by the method of claim 1.

* * * * *